United States Patent [19]

Sulwer

[11] Patent Number: 4,989,639
[45] Date of Patent: Feb. 5, 1991

[54] BRAKE BLEEDER CHECK VALVE

[76] Inventor: Michael T. Sulwer, Carpenter & Dystrup Sts., Lemont, Ill. 60439

[21] Appl. No.: 338,817

[22] Filed: Apr. 17, 1989

Related U.S. Application Data

[63] Continuation-in-part of Ser. No. 267,970, Nov. 7, 1988, Pat. No. 4,869,292, which is a continuation-in-part of Ser. No. 192,048, May 9, 1988, abandoned.

[51] Int. Cl.⁵ ............................................. F16K 11/20
[52] U.S. Cl. .................................. 137/614.17; 188/352
[58] Field of Search ...................... 137/614.17; 60/584; 188/352

[56] References Cited

U.S. PATENT DOCUMENTS

| | | | |
|---|---|---|---|
| 2,771,093 | 11/1956 | Wilson | 137/614.17 |
| 3,050,080 | 8/1962 | Pagano | 137/614.17 |
| 3,913,619 | 10/1975 | Aulner, Sr. et al. | 137/614.17 |
| 4,318,460 | 3/1982 | Kosinski | 60/584 X |
| 4,470,577 | 9/1984 | Warwick | 188/352 X |
| 4,834,140 | 5/1989 | Schmidt | 137/614.17 |

FOREIGN PATENT DOCUMENTS 1596096  8/1981  United Kingdom ............... 188/352

Primary Examiner—John C. Fox
Attorney, Agent, or Firm—Ernest Kettelson

[57] ABSTRACT

A brake bleeder check valve comprising an elongated bleeder valve body to seat in the bleeder valve recess of a wheel brake housing of a hydraulic brake system for vehicles, to seal the bleeder valve recess closed until the bleeder valve body is loosened for the purpose of bleeding air from the hydraulic lines. An inlet aperture is sealed off from hydraulic fluid in the brake system when the valve body is tightened and fully seated in a bleeder valve recess. A hemi-spherical check valve seat is provided between first and, second passageways of the valve, and a ball check valve is positioned in the larger diameter first passageway together with a coiled compression spring to normally bias the ball check valve to the check valve closed position. When the brake pedal is depressed during a bleeding operation and with the valve body loosened in the bleeder valve recess, hydraulic fluid and entrapped air are forced into the recess to enter the inlet aperture in the side wall of the valve body and on to the ball check valve. The pressurized hydraulic fluid pushes the ball check valve open to continue on through the first passageway and out through the outlet aperture. The brake bleeder valve does not have to be re-tightened in the bleeder valve recess between each downward stroke of the brake pedal to prevent leakage of hydraulic fluid and re-introduction of air into the lines during the interim between downward strokes.

3 Claims, 8 Drawing Sheets

BRAKE BLEEDER CHECK VALVE

PRIOR APPLICATIONS

This application is a division of prior application Ser. No. 267,970 filed Nov. 7, 1988, Pat. No. 4,869,292, which in turn is a continuation-in-part of parent application Ser. No. 192,048 May 9, 1988, now abandoned.

BACKGROUND OF THE INVENTION

This invention relates to the field of brake bleeder valves used to bleed hydraulic fluid lines of hydraulic brake systems of vehicles, and particularly to those having some kind of check valve mechanism within the bleeder valve body or combined therewith.

Brake bleeder valves of this kind which are presently known have the disadvantage that the passageway through the valve body in which the check valve mechanism is located opens directly into the hydraulic cylinder or chamber of the system located at each wheel. If the check valve leaks, hydraulic fluid can flow directly from the system out through the bleeder valve. Some attempts to correct this problem have provided such things as a two piece bleeder valve, in which one piece is a cap that can be tightened and loosened relative to the other piece that is screwed into the housing of the hydraulic cylinder or chamber. The one piece which is screwed into the housing has a first hemi-spherical valve seat to receive the bottom half of a ball check valve, and the cap has a second hemi-spherical valve seat to receive the top hand of the ball check valve. When the cap is screwed down tight on the other piece, the ball check valve is thereby held in the valve seat in the valve closed position. In the event a stripped thread or obstruction of some kind prevents the cap from being fully and completely tightened, the ball check valve remains loose with only a spring biasing it toward the valve closed position. When the brakes of the vehicle are applied thereby pressurizing the hydraulic fluid in the lines, such pressurized fluid enters the passageway of this prior art type of bleeder valve which opens directly into the system. The pressurized fluid can become strong enough to overcome the bias of the spring holding the check valve in place, whereby fluid can leak out through the bleeder valve.

The present invention overcomes this and other problems of prior art brake bleeder check valves. The valve body in accordance with the present invention is a one-piece unit in which the entrance to the passageway through the valve body is in the side wall of the valve body and is not in communication at all with the hydraulic cylinder or chamber of the hydraulic system when the bleeder valve body is in its tightened and closed position. In this type of bleeder valve body construction, no separate mechanism is needed to hold the check valve in place sine pressurized hydraulic fluid cannot reach the check valve and force it open until the one-piece valve body itself has been loosened enough to permit hydraulic fluid to flow out of the closed system into the bleeder valve recess whereby it can then enter the side wall entrance of the bleeder valve body.

Examples of prior art bleeder valves known to the inventor in this case include those disclosed in the following U.S. Patents.

Pat. No. 4,524,800 discloses a two part brake bleeder check valve of the prior art type described above.

Pat. No. 2,865,398 discloses a brake bleeder check valve assembly that is not a permanent part of the hydraulic system, but has to be either inserted in place of the original screw plug or connected to an original equipment air bleed connector by means of an adapter.

Pat. No. 2,256,516 discloses a bleeder fitting for brake cylinders which is also not a permanent part of the hydraulic brake system. The original plug has to be removed and the bleeder fitting disclosed in this patent is then screwed in place. It has a direct opening to the hydraulic system whereby pressure on the fluid in the system will be applied directly to the check valve thereby forcing it open. This type of bleeder fitting could not be used as a permanently mounted bleeder check valve of a hydraulic brake system.

SUMMARY OF THE INVENTION

It is an object of the invention to provide a brake bleeder check valve that can be mounted as a permanent part of a hydraulic brake system in which pressurized fluid within the hydraulic system cannot reach the check valve mechanism of the bleeder valve until the bleeder valve itself has been loosened in its bleeder valve recess of the portion of the hydraulic system in which it is mounted.

It is an object of the invention to provide a brake bleeder check valve of one piece construction having a passageway therein opening at one end to the side wall of the valve body for entrance of fluid and air when the valve body is loosened in its receiving recess and opening at the other end for discharge of such fluid and air, and a check valve in said passageway normally biased in the valve closed position and openable against such bias when pressure is applied to the hydraulic fluid reaching the side wall entrance of the valve body when loosened.

DESCRIPTION OF PREFERRED EMBODIMENT

Figure 1:
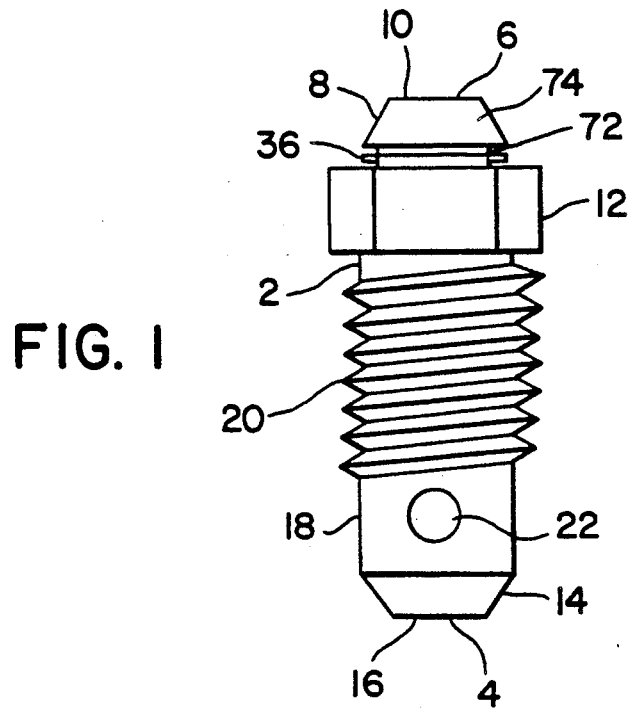
FIG. 1 is a side elevation view of a brake bleeder check valve in accordance with this invention.
Figure 2:
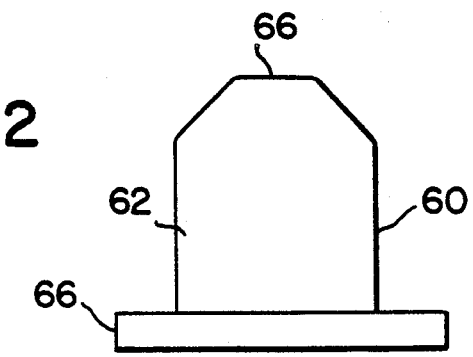
FIG. 2 is a side elevation view of a protective cap to fit on the brake bleeder check valve shown in FIG. 1 to protect it from corrosion and damage using the interim periods between brake line bleeding operations.
Figure 3:
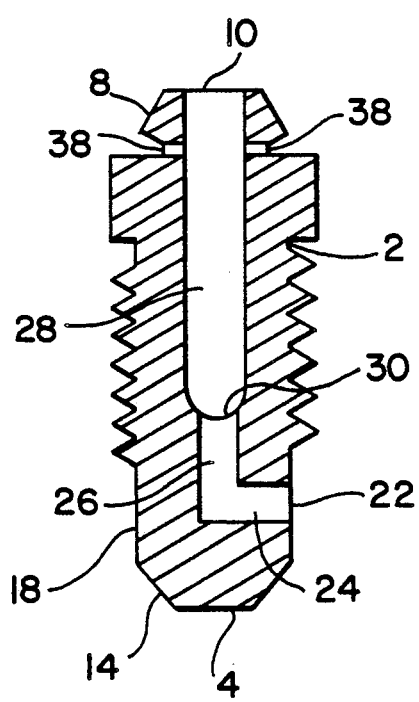
FIG. 3 is a section view of the integrally formed single piece valve body shown with the check valve mechanism removed.
Figure 4:
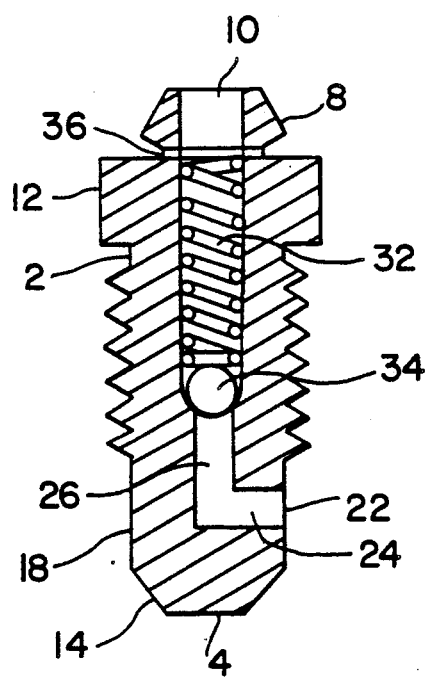
FIG. 4 is a section view of the valve body shown in FIG. 3, having the check valve mechanism in place.
Figure 5:
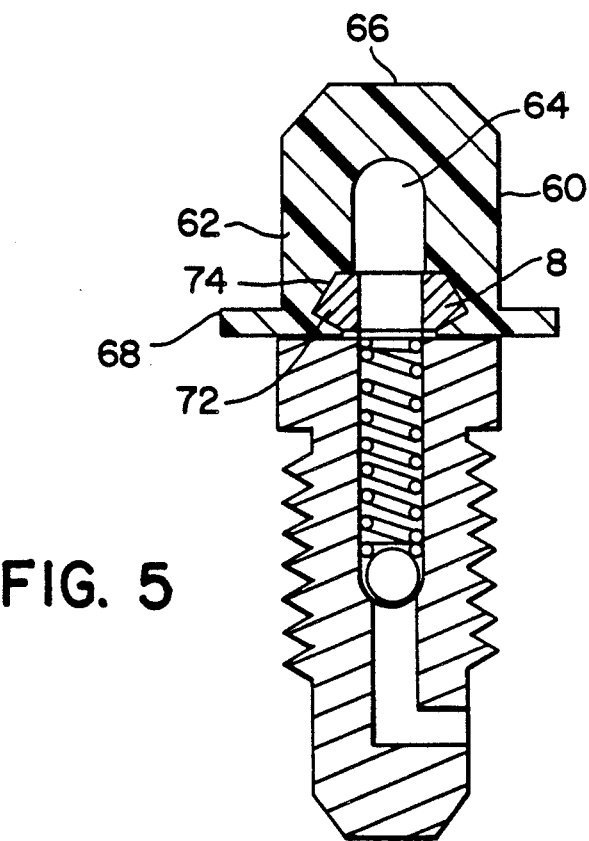
FIG. 5 is a section view of the valve body as seen in FIG. 4, having the protective cap shown in FIG. 2 in place, also shown in section.
Figure 6:
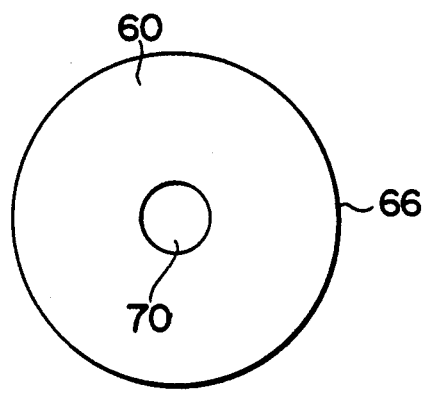
FIG. 6 is a bottom plan view of the protective cap shown in FIG. 2.

A brake bleeder check valve in accordance with this invention includes an elongated cylindrical valve body 2 having an inwardly extending sealing end 4 and an outwardly extending discharge end 6. The discharge end 6 terminates in a nipple 8 having an outlet aperture 10 in the center thereof.

A hexagonal nut 12 is integrally formed with the valve body 2 at its outwardly extending end portion 6 just inwardly of the nipple 8.

The inwardly extending sealing end 4 has a frusto-conical configuration comprising a tapered wall portion 14 converging toward the inwardly extending end 4 and terminating in a flat relatively small diameter end wall 16.

A cylindrical smooth side wall portion 18 of the valve body 2 extends from the tapered wall portion 14 for a short distance in the direction toward the outwardly extending end 6, terminating at a threaded section 20. The threaded section 20 of the valve body 2 comprises external threads formed on the valve body and extends from the cylindrical smooth side wall portion 18 in the direction toward the outwardly extending end 6, and terminates at the integrally formed hexagonal nut 12.

An inlet aperture 22 opens to the smooth side wall portion 18 of the valve body 2 and to a radially extending inlet port 24. The inlet port 24 extends inwardly from the inlet aperture 22 and opens to a longitudinally extending central bore portion 26 which extends a short distance in the direction toward the outwardly extending discharge end 6 of the valve body 2. The central bore portion 26 in turn opens to an elongated enlarged diameter cylindrical chamber 28, having a hemi-spherical ball valve seat 30 at its innermost end opening to the central bore portion 26. The cylindrical chamber 28 extends longitudinally and axially from its innermost end and valve seat 30 in the direction toward the outwardly extending end 6 of the valve body 2, and terminates at the outlet aperture 10 at the outwardly extending end of the valve body 2.

The central bore portion 26 and cylindrical chamber 28 extend longitudinally of the valve body 2, axially aligned with each other and coaxial with the axis of the valve body 2. The diameter of the central bore portion 26 is smaller than the diameter of the elongated cylindrical chamber 28.

The diameter of the elongated cylindrical chamber 20 is large enough to receive the elongated coil compression spring 32 and ball valve 34 therein. The ball valve 34 is positioned in registration with the ball valve seat 30 to seat therein and normally close entrance to the elongated cylindrical chamber 28 and outlet aperture 10 under bias of the compression spring 32. Passage from the inlet aperture 22, inlet port 24 and central bore portion 26 into the elongated cylindrical chamber 28 and outlet aperture 10 is therefore normally closed. However, when fluid pressure of sufficient force is applied against the ball valve 34 it is moved outwardly of the valve seat 30 against the bias of the coil spring 32 to enable passage of fluid into the elongated cylindrical chamber 28 and out through the outlet aperture 10 as long as such force and fluid pressure is applied against the ball valve 34. As soon as it is no longer applied, the compression coil spring 32 biases the ball valve 34 back into the valve seat 30 to close further passage of fluid from the inlet aperture 22, inlet port 24 and central bore portion 26 into and through the elongated cylindrical chamber 28 and outlet aperture 10.

The coil spring 32 has a diameter corresponding to that of the outlet aperture 10 and elongated cylindrical chamber 28, as does the ball valve 34. They can be inserted into the elongated cylindrical chamber 28 through the outlet aperture 10. A retaining pin 36 is inserted through pin apertures 38 provided through the side wall of the nipple 8 just outward of the hexagonal nut 12 to hold the spring 32 in place. When held in place by the retaining pin 36 bearing against one end of the spring 32 and its other end bearing against the ball valve 34, the spring 32 is compressed sufficiently to bias the ball valve 34 in the ball seat valve 30 to prevent passage of fluid from the inlet aperture 22, inlet port 24 and central bore portion 26 into the elongated cylindrical chamber 28 and out through the outlet aperture 10 until a predetermined amount of fluid pressure is applied.

An insert tool having a hook end to engage a portion of the spring 32 can be used to insert it into the elongated cylindrical chamber 28 and compress it enough for the retaining pin 36 to be inserted through the retaining pin apertures 38 to bear against the outwardly facing end of the spring 32, after which the spring can be released and the insert tool removed.

There are a variety of other ways in which the spring 32 can be inserted, compressed and retained in the elongated cylindrical chamber 28 to bias the ball valve 34 in the seat 30 to prevent fluid passage until a predetermined amount of fluid pressure is applied.

The brake bleeder check valve in accordance with this invention is used by screwing the valve body 2 into the internally threaded bore 40 of the bleeder valve recess 42 in the brake cylinder housing 44 of each wheel of a vehicle having a hydraulic brake system in which the hydraulic fluid is pressurized by a master cylinder in response to pressure applied to the foot brake pedal by an operator inside of the vehicle. The internally threaded bore 40 of the bleeder valve recess 42 extends from its outer aperture 46 to a sealing aperture 48 opening to the fluid chamber within the brake cylinder housing 44.

The internally threaded bore 40 terminates inwardly at a converging inner wall portion 52 having a frusto-conical configuration and dimension corresponding to that of the other tapered wall portion 14 of the valve body 2 of the bleeder valve. Thus, when the valve body 2 of the bleeder valve in accordance with this invention is screwed into the bleeder valve recess 42 to its full extent, the tapered outer wall portion 14 of the valve body 2 seats in the converging wall portion 52 of the bore 40 of bleeder valve recess 42 of the brake cylinder housing 44 to seal it closed. When in such closed position, hydraulic fluid cannot escape from the fluid chamber 50 within the housing 44.

The bleeder valve in each brake cylinder housing of each wheel is provided to bleed the hydraulic fluid lines for the purpose of removing air which may have gotten into the lines such as during a brake repair operation or replacement of a master cylinder or part thereof. In order to bleed the lines and expel any air that has gotten in, the bleeder valve body 2 is loosened bY applying a wrench to the hexagonal nut portion 12 and rotating until the tapered outer wall portion 14 of the valve body 2 has been separated from the converging inner wall portion 52 of the bleeder valve recess 42. Hydraulic fluid can then flow out of the fluid chamber 50 through the now open sealing aperture 48 into the bore 40. The hydraulic fluid is then able to flow into the side wall inlet aperture 22 of the bleeder valve body 2, through its inlet port 24 and central bore portion 26 up to the entrance to the elongated cylindrical chamber 28.

Further flow of the hydraulic fluid in the bleeder valve body 2 is blocked by the ball valve 34 seated in the valve seat 30 and held there by the bias of compression spring 32.

The next step in the line bleeding operation is for an operator in the vehicle to press down on the brake pedal which causes the master cylinder to pressurize the hydraulic fluid in the line leading to the brake cylinder chamber 50 forcing hydraulic fluid under pressure into the bleeder valve body 2. Such pressure is sufficient to force the ball valve 34 out of the valve seat 30 whereby hydraulic fluid and any air in the line is expelled through the elongated cylindrical chamber 28 and out through the outlet aperture 10.

When the pressure from the first depression of the brake pedal is exhausted, the compression spring 32 biases the ball valve 34 back to the valve seat 30 to prevent leakage of hydraulic fluid until the operator has let the brake pedal out and depressed again ro apply a second flow of pressurized hydraulic fluid and any air still in the lines. This causes the ball valve 34 to again separate from the valve seat 30 to expel additional air and hydraulic fluid. As the pressure from such second flow of pressurized hydraulic fluid and air is dissipated, the spring 32 again biases the ball valve 34 back to the valve seat 32 to prevent leakage of hydraulic fluid. This process can be repeated until all of the air has been expelled from the hydraulic brake lines.

When all of the air has been expelled from the hydraulic brake lines, the bleeder valve body 2 is screwed back into its closed position in the bleeder valve recess 42 with the tapered outer wall portion 14 of valve body 2 seated tightly in the corresponding converging wall portion 52 of the bore 40 of the bleeder valve recess 42. This prevents further hydraulic fluid to flow from the fluid chamber 50 of brake cylinder housing 44 into the bleeder valve recess 42 and from reaching the inlet aperture 22 and inlet port 24 of the bleeder valve body 2.

With existing prior art bleeder valves, the valve body has to be tightened in the valve recess after each downward stroke of the brake pedal to prevent leakage of hydraulic fluid while the brake pedal is being let out. Then when ready to make another downward stroke to expel more air, the bleeder valve body of the existing prior art type has to again be loosened so hydraulic fluid and any remaining air in the line can reach the inlet aperture and inlet port of the valve body for discharge through its central bore and outlet apertures during the next downward stroke of the brake pedal.

During the line bleeding operation, a discharge hose 56 is connected at one end to the nipple 8 to receive the hydraulic fluid expelled during each downward stroke of the brake pedal. The outlet end of the discharge hose is placed in a container 58 to collect the expelled fluid.

A protective closure cap 60 is provided for the nipple 8 to protect it from corrosive elements during the periods between the times when the brake lines have to be bled. The closure cap 60 is made of a compressible material such as rubber and comprises a cylindrical wall portion 62 bounding a cylindrical cavity 64 to receive the nipple 8. The cylindrical wall portion 62 terminates at its outwardly extending end in a closed end wall 66 having a tapered frusto-conical configuration, and at its inwardly extending end in an annular flange 66 projecting radially outward from the cylindrical wall portion 62. The annular flange 68 surrounds a circular aperture 70 opening to the cylindrical cavity 64.

The diameter of the circular aperture 68 and cylindrical cavity 64 of the closure cap 60 is slightly smaller than the corresponding diameter of the widest portion 72 of the frusto-conical outer wall 74 of the nipple 8. The closure cap 60 being made of compressible material, the diameter of the circular aperture 68 and cylindrical cavity 64 is expandable to snugly receive the somewhat larger diameter widest portion 72 of the outer wall 74 of the nipple 8 into the cavity 64 of the closure cap 60 and to retain it therein. The compressive force of the expanded cylindrical wall portion 62 of the cap 60 grips together against the outer wall 74 of the nipple 8 to prevent removal until pried off at the time the next brake line bleeding operation is to take place.

The smooth cylindrical side wall portion 18 of the valve body 2, which extends between the tapered wall portion 14 and the threaded section 20 of the valve body 2, and the smooth cylindrical side wall portion 80 of the bore of the bleeder valve recess 42 have diameters of substantially equal dimension, that of portion 18 of the valve body 2 being slightly smaller to be received in the portion 80 of the bore of the bleeder valve recess 42 but with the walls of each being in full facing contact with each other when portion 18 of valve body 2 is fully seated in the portion 80 of the bore of the bleeder valve recess 42.

The peripheral dimension and configuration of the tapered wall portion 14 of the valve body 2 and that of the converging inner wall portion 52 of the bore of the bleeder valve recess 42 are also substantially equal whereby the entire annular surface of tapered wall portion 14 is in full facing contact with the entire annular surface of the converging inner wall portion 52 of the bore of the bleeder valve recess 42 when the valve body 2 is fully seated in the recess 42.

Such full facing contact of portion 18 of valve body 2 with portion 80 of the bore of valve recess 42, and of tapered wall portion 14 of valve body 2 with the converging inner wall portion 52 of the bore of valve recess 42 when valve body 2 is fully seated in the recess 42 effectively seals the sealing aperture 48 and bore of valve recess 42 against entry of brake fluid from the fluid chamber 50 of the brake cylinder housing 44. Such full facing contact effectively prevents brake fluid in the fluid chamber 50 from reaching and entering the inlet aperture 22 opening to portion 18 of valve body 2, since portion 18 is in full facing contact with the corresponding side wall of portion 80 of the bore of valve body 2.

Figure 7:
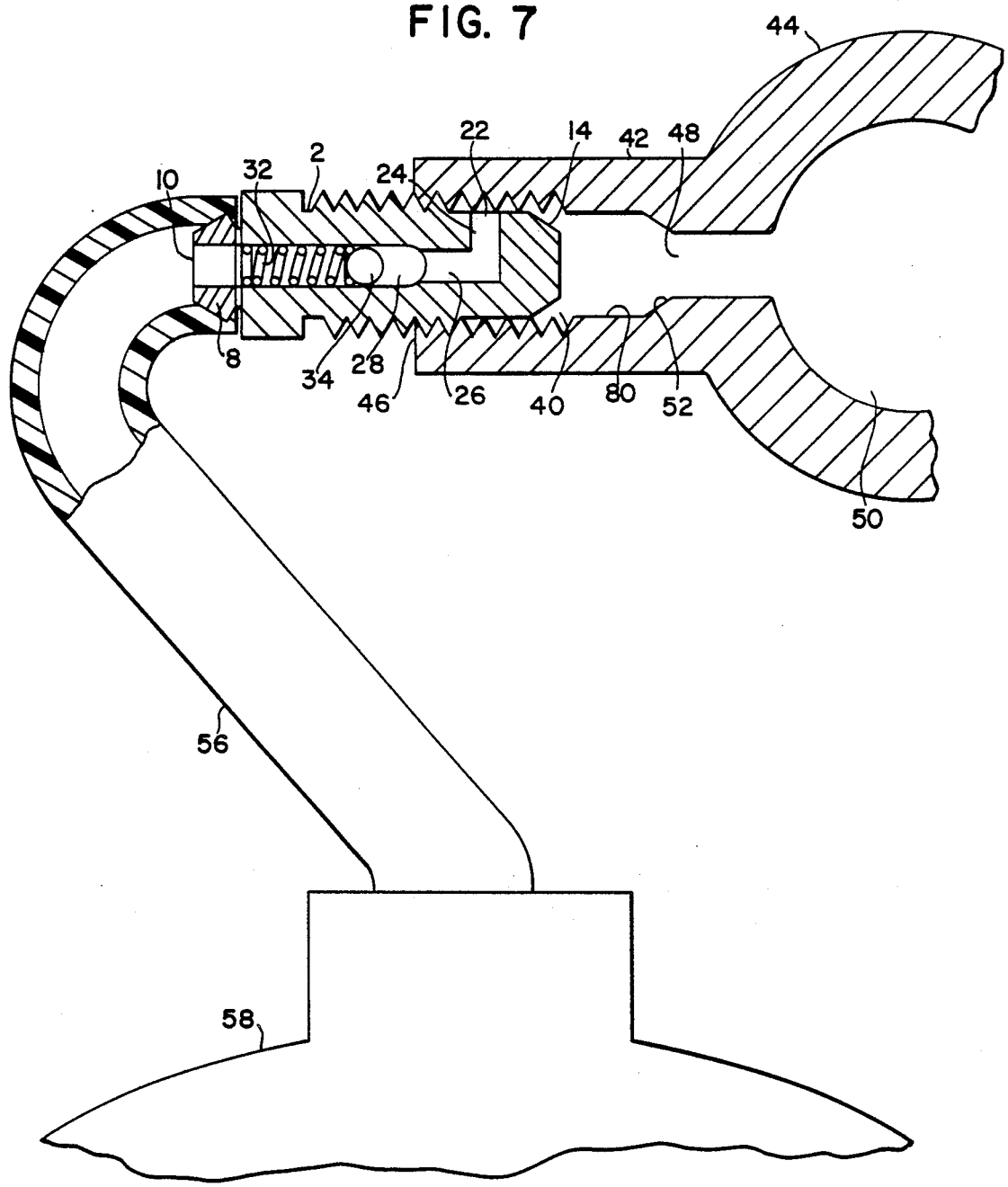
FIG. 7 is a section view of a brake bleeder check valve in accordance with this invention and of its receiving recess in the housing of a wheel brake cylinder, the ball check valve shown in the check valve open position for hydraulic fluid to flow under pressure from the hydraulic cylinder through the bleeder check valve and into discharge hose and container as air is expelled from the system.
Figure 8:
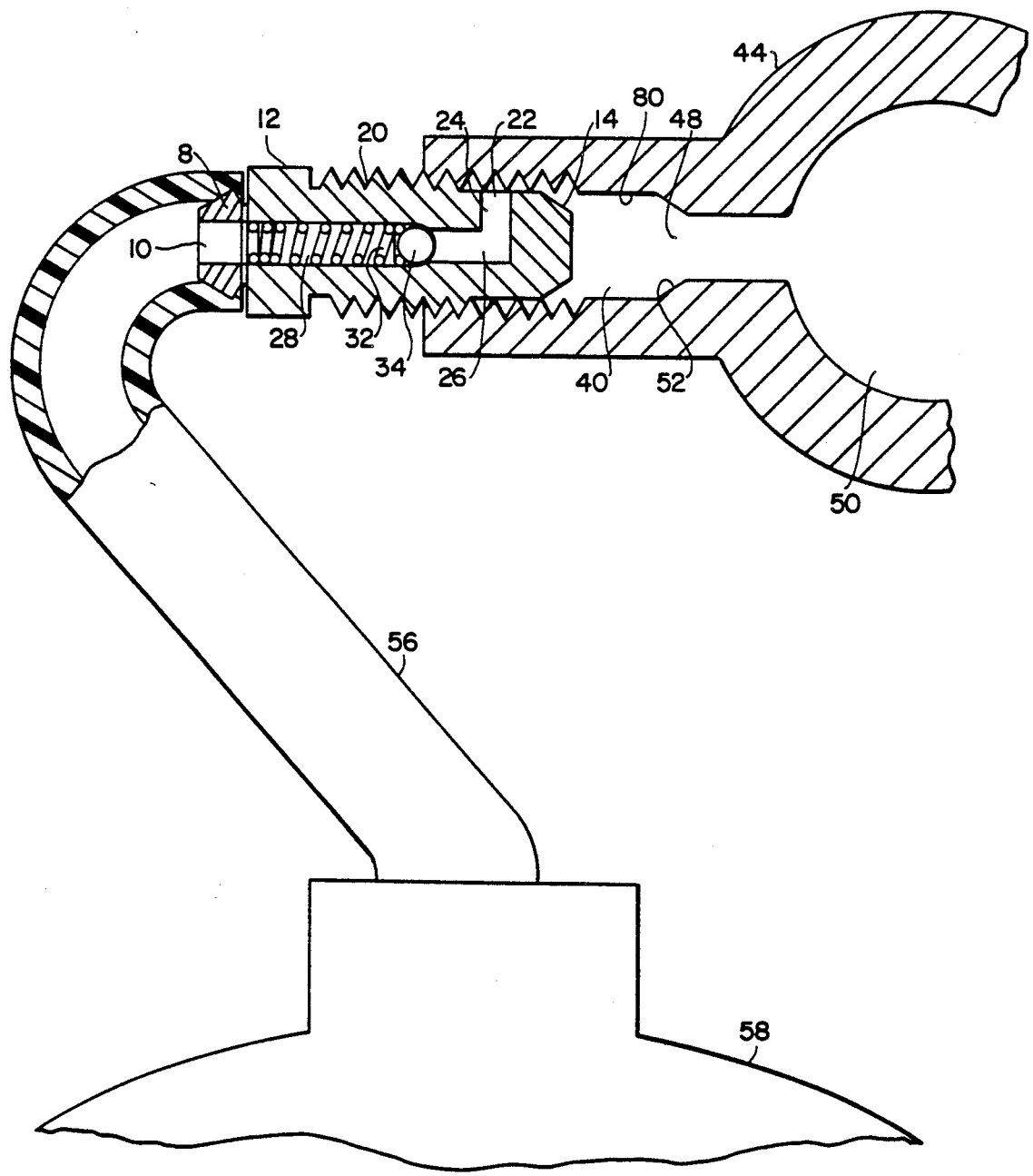
FIG. 8 is a second view similar to that of FIG. 7 but showing the bleeder check valve in the check valve closed position to prevent leakage of hydraulic fluid and back flow of air into the system during the interim period between pressurized strokes of the brake pedal.
Figure 9:
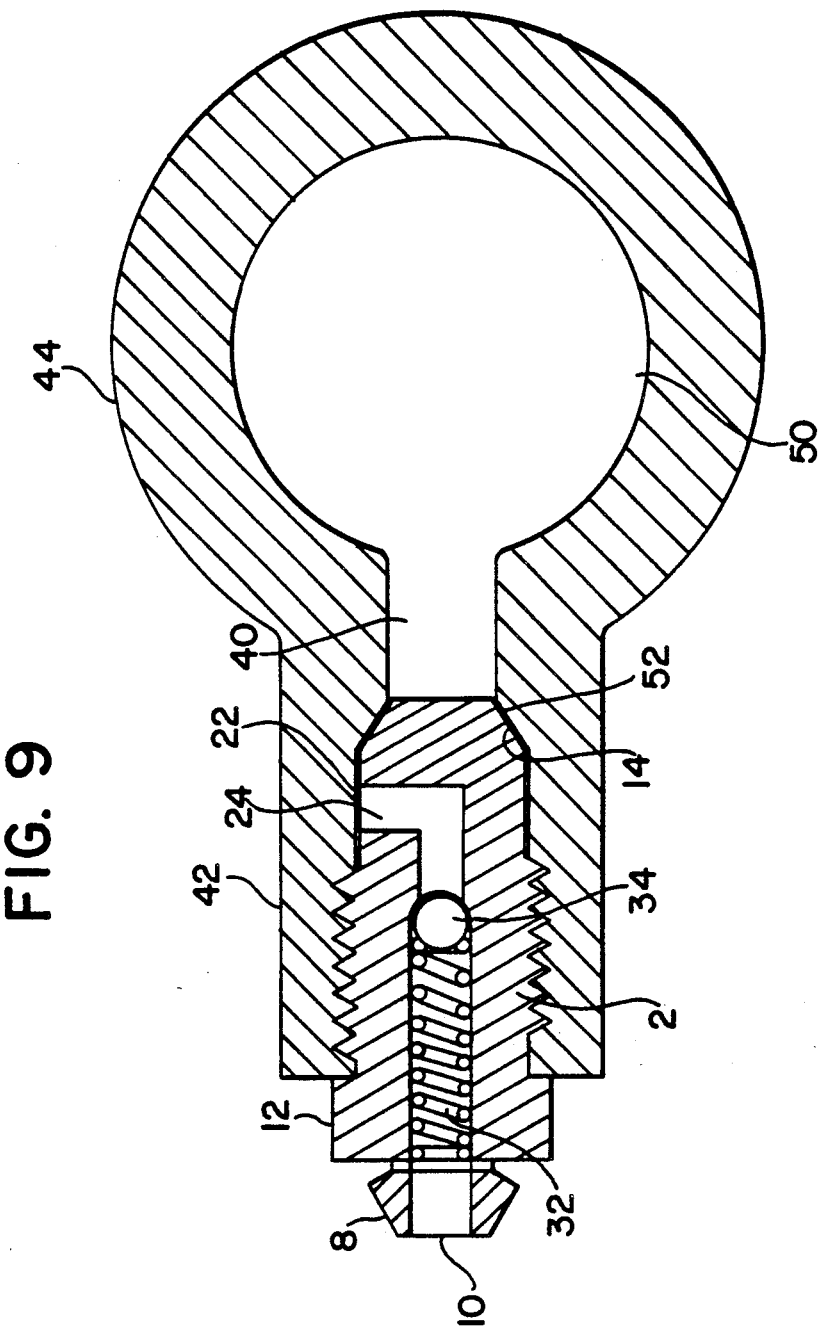
FIG. 9 is a section view showing the brake bleeder check valve fully seated in its recess in the housing of the hydraulic brake cylinder.

When the valve body 2 is rotated to unscrew it in he outward direction a sufficient distance for inlet aperture 22 of portion 18 and tapered wall portion 14 to reach the internally threaded bore portion 40 of the valve recess 42 as seen in FIG. 7, there is then enough clearance to enable brake fluid to flow from the fluid chamber 50 into the bore of brake recess and into the inlet aperture 22 of the valve body 2 for bleeding of air from the system.

Figure 10:
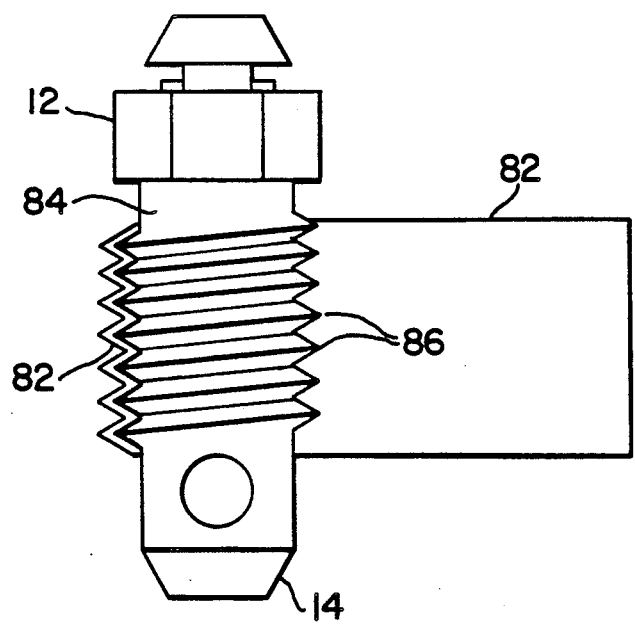
FIG. 10 is a side elevation view of a brake bleeder check valve in accordance with this invention showing a strip of sealing tape partially applied to the threaded section of the valve body and in position to be wrapped completely around the threads.

In order to prevent air from being drawn back into the chamber 50 when pressure from the first depression of the brake pedal has been exhausted and it is being let out again in preparation for the next downward stroke, the threaded section 20 of the valve body 2 is coated with a thin layer of sealing material such as sealing tape 82 as shown in FIG. 10. Such sealing tape is offered for sale under the trademark Teflon. Other sealing material such as caulking compounds are available to seal threaded members when seated in threaded recesses or partially seated therein. The sealing tape 82 adheres to the external threads of the valve body when applied and continues to adhere when the external threads are threadedly engaged with the corresponding internal threads of the valve recess and received therein.

In the embodiment of the invention shown and described in FIG. 10, the entire shank 84 of the valve body 2 between the hexagonal nut 12 and the tapered wall portion 14 has the same diameter prior to forming the threads thereon throughout the threaded section 20. Formation of the threads thereon causes the annular peaks 86 of the threads to project radially outwardly from the smooth wall portions of the shank 84 after the threads have been cut into the threaded section 20 thereof.

The shanks of brake bleeder valves in accordance with this invention may have portions of different diameter, provided the smooth wall portion 18 of valve body 2 has a diameter which corresponds in dimension to that of the smooth cylindrical side wall portion 80 of the bore of the bleeder valve recess in which it is to be used to provide full facing contact throughout one with the other when the valve body 2 is fully seated in the valve recess, and provided further that the tapered wall portion 14 of the valve body 2 has a peripheral dimension and configuration which corresponds to that of the converging inner wall portion 52 of the bore of the valve recess 42 to provide full facing contact between those two portions as well when the valve body 2 is fully seated in the valve recess.

Such corresponding dimensions and configurations between these portions of the valve body and valve recess not only assure effective sealing against leakage of brake fluid but prevent screwing the valve body so tightly into the valve recess that the tapered leading end breaks into and begins to split apart the corresponding tapered bore part of the valve recess. That can happen if the tapered leading end of the valve body is smaller than the converging inner wall portion of the valve recess bore surrounding the aperture leading into the fluid chamber of the brake cylinder housing. In such case, the smaller dimension tapered end of the valve body can be forced wedge-like into and beyond the converging inner wall portion of the valve recess causing the aperture to spread apart. That both weakens and deforms the sealing aperture and the wall portions of the valve recess surrounding the sealing aperture, with likelihood of failure to effectively seal the break fluid against leakage.

The structure of the present invention as described hereinabove effectively overcomes and avoids that problem.

I claim:

1. A brake bleeder valve and wheel brake cylinder housing combination, said break bleeder valve having an elongated valve body, an externally threaded cylindrical wall portion, an unthreaded sealing end portion extending from said externally threaded cylindrical wall portion and terminating at an inwardly extending sealing end, said wheel brake cylinder housing having a peripheral wall surrounding a cavity, an elongated cylindrical valve recess through said peripheral wall opening to said cavity, said recess including an internally threaded cylindrical wall portion, an unthreaded sealing portion extending from said internally threaded cylindrical wall portion inwardly and terminating at a sealing end of said recess surrounding an opening of said recess to said cavity, said externally threaded cylindrical wall portion of said valve body being rotatable within said internally threaded cylindrical wall portion of said valve recess to move said valve body between a first tightened position in which said inwardly extending sealing end of said valve body reaches said sealing end of said valve recess to sealingly close said cavity of said wheel brake cylinder housing and a second loosened position in which said sealing end of said valve body is drawn away from said sealing end of said valve recess to open said cavity of said wheel brake cylinder housing to aid valve recess such that air and brake fluid can be bled from the brake cylinder when said valve is in the loosened position and force is applied to a brake pedal to cause air and brake fluid to flow through said valve, a thin layer of sealing material between said externally threaded cylindrical wall portion of said valve body and said internally threaded cylindrical wall portion of said valve recess to seal against passage of air between aid externally threaded and internally threaded portions when said valve body is in said second loosened position within said valve recess whereby passage of air between said externally threaded and internally threaded portions is prevented during return movement of the brake pedal when said valve body is in the loosened position after a bleeding stroke of the pedal such that passage of air into the brake cylinder is prevented even where the ambient air pressure exceeds the pressure within the cylinder as a result of the brake pedal return after a bleeding stroke.

2. A brake bleeder valve and wheel brake cylinder housing combination as set forth in claim 1, wherein said thin layer of sealing material comprises a length of sealing tape wrapped around said externally threaded cylindrical wall portion of said valve body and adhered thereto, including when threadedly engaged with the corresponding internally threaded portion of said valve recess and when said valve body is in said second loosened position within said valve recess.

3. A brake bleeder valve comprising an elongated valve body having an externally threaded cylindrical wall portion adapted to be received in a corresponding internally threaded bleeder valve recess of a wheel brake cylinder housing, said elongated valve body having a sealing end portion, a longitudinal cavity in said elongated valve body opening at one end to an outlet aperture in the outwardly extending end portion of said valve body opposite said sealing end portion thereof, said longitudinal cavity extending inwardly of said valve body to a laterally extending portion which terminates at a side wall aperture opening to a side wall portion of said valve body, including said laterally extending portion of said cavity, said longitudinal cavity and said laterally extending portion providing a passageway thorough said valve body from said side wall aperture to said outlet aperture, check valve means in said passageway operable between a valve open and valve closed position to block passage of fluid in the direction from said side wall aperture to said outlet aperture when in its said valve closed position, said externally threaded valve body being rotatable within said internally threaded valve recess for movement between a first position in which said valve recess is closed to said wheel brake cylinder housing and a second position wherein it is open thereto such that air and brake fluid can be bled from the brake cylinder when said valve is in the loosened position and force is applied to a brake pedal to cause air and brake fluid to flow through said valve, and a thin layer of sealing material around said externally threaded cylinder wall portion to seal against passage of air between said externally threaded cylindrical wall portion of said valve body and said internally threaded bleeder valve recess when received therein and when said valve body is in its said second position within said valve recess wherein said valve recess is open to said wheel brake cylinder housing whereby passage of air between said externally threaded and internally threaded portions is prevented during return movement of the brake pedal when said valve body is in the loosened position after a bleeding stroke of the pedal such that passage of air into the brake cylinder is prevented even where the ambient air pressure exceeds the pressure within the cylinder as a result of the brake pedal return after a bleeding stroke.

* * * * *